Patented Sept. 15, 1953

2,652,398

UNITED STATES PATENT OFFICE 2,652,398

N-SUBSTITUTED-2-AMINO(METHYL) QUINOLINES

Irving Allan Kaye, Brooklyn, N. Y., assignor to Endo Products, Inc., Richmond Hill, N. Y., a corporation of New York No Drawing. Application November 17, 1949, Serial No. 128,013

2 Claims. (Cl. 260—288)

This invention relates, in its principal aspects, to novel compounds possessing enhanced antihistaminic activity. In particular, with respect to such compounds, this invention is directed to novel derivatives of 2-amino-quinolines, especially in the form of secondary and tertiary amines whereof the 2-lepidyl radical is a constituent.

In other aspects, this invention is directed to novel compounds related to the aforesaid tertiary amines, the same being, inter alia, especially useful as intermediates for the preparation of said tertiary amines.

It is noteworthy that known compounds some of which are employed herein as intermediates in the preparation of the aforesaid ultimate secondary and tertiary amines possess anti-malarial activity. It was surprising, accordingly, to discover that there could be derived from such intermediates new products having pharmacologic and physiologic activity so strikingly different in character from the parent compounds.

It will also be understood that this invention is directed not only to these novel secondary and tertiary amines, but to the salts thereof.

As a matter of general formulation with respect to the primary phase of the invention, the new secondary and tertiary amines are represented by the following formula:

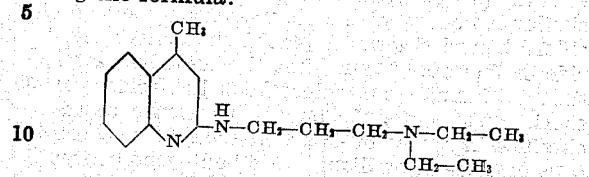

wherein R' designates a member of the group consisting of hydrogen, alkyl, amino alkyl and N-substituted amino alkyl, and N-disubstituted amino alkyl wherein the N-substituents form a ring with said nitrogen, and R" designates a member of the group consisting of hydrogen, aryl, aryl alkyl, heterocyclic, heterocyclic alkyl, ring substituted aryl, ring substituted aryl alkyl, and ring substituted heterocyclic alkyl, the compounds being characterized further in that not more than one of the substituents designated by the symbols R' and R" may be hydrogen at any one time.

The following examples are members of the foregoing class of compounds. In the descriptions of these embodiments the melting points reported are all corrected. The boiling points reported are not corrected.

Example 1

2-(γ-diethylamino propyl)-aminolepidine having the formula:

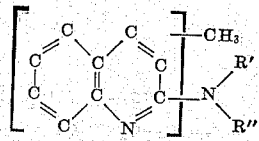

0.1 mole of 2-chlorolepidine and 0.4 mole of γ-diethylamino propylamine were heated at a bath temperature of 180–189° C. for 7 hours. The cooled reaction mixture was suspended in about 500 ml. of ether. The hygroscopic precipitate was separated by filtration and washed well with either. The filtrate, after removal of the ether and excess γ-diethylamino propylamine, was distilled in vacuo. The yield was 98.2% (26.6 grams); boiling point, 127° C. at 0.02 mm.

It was noted that longer periods of refluxing gave poorer yields (a 70% yield resulted after refluxing for 19 hours) due, apparently, to decomposition, evidenced by large amounts of tarry byproducts.

*Analysis.*—Calculated for $C_{17}H_{26}N_3$: N, 15.49%. Found: N, 15.55%.

The dihydrochloride salt of this compound, recrystallized once from isopropanol-acetone and again from isopropanol, melted at 144.0–145.4° C.

Example 2

2-benzylaminolepidine having the formula:

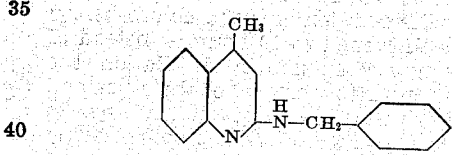

A mixture of 31.6 grams (0.2 mole) of 2-aminolepidine and 4.6 grams of lithium amide in 100 ml. of dry toluene was refluxed for 2 hours in an oil bath at 120–130° C. After cooling somewhat, 25.3 grams (0.2 mole) of benzyl chloride in 50 ml. of dry toluene was added and the mixture refluxed for 21.5 hours longer. The mixture was filtered, and the precipitate washed well with ether. After removal of the ether and toluene from the filtrate, the residue was distilled in vacuo, yielding 36.9 grams (74.2%) of a viscous orange oil having a boiling point of 156–167° C. at 0.03 mm. The product solidified on rubbing with petroleum ether. It had a melting point of 72.4–73.0° C.

The hydrochloride was prepared by adding concentrated hydrochloric acid to a methanolic solution of this new base, followed by the copious addition of ice and water. The white solid which precipitated was recrystallized from 95% ethanol. This salt had a melting point of 236–238.5° C.

*Analysis.*—Calculated for $C_{17}H_{16}N_2 \cdot HCl$: Cl, 12.45%. Found: Cl, 12.58%.

Example 3

2-(2-chlorobenzyl)-aminolepidine having the formula:

This new product was prepared in accordance with the procedure described in Example 2, using similar amounts of reactants, except that o.-chloro-benzyl chloride replaced the benzyl chloride of Example 2, and that the refluxing, after the addition of the o.-chloro-benzyl chloride, was carried out only for 13.5 hours. The new base was obtained in a yield of 45 grams (79.7%) as a viscous orange-yellow liquid. Its boiling point was 169–170° C. at 0.03 mm. The product solidified when treated with petroleum ether. On recrystallization from 95% ethanol to constant melting point, using decolorizing charcoal, the product melted at 102.8–103.8° C.

*Analysis.*—Calculated for $C_{17}H_{15}N_2Cl$: N, 9.91%. Found: N, 9.90%.

Example 4

2-(4-chlorobenzyl)-aminolepidine having the formula:

This new product was prepared in accordance with the procedure described in Example 2, using similar amounts of reactants, except that p.-chloro-benzyl chloride replaced the benzyl chloride of Example 2, and that the period of refluxing, after the addition of the p.-chloro-benzyl chloride, was shortened to 10 hours. Instead of isolating the new compound by distillation, the residue remaining after removal of the ether and toluene, was triturated with petroleum ether to yield 27.8 grams (49.2%) of crude product having a melting point of 113–116° C.

It is to be noted that the foregoing yield could have been improved had the product been isolated by distillation, as the yield of crude 2-(2-chlorobenzyl)-aminolepidine (Example 3), having a melting point of 93.5–100° C., dropped to 62.5% (56.4 grams) when prepared in similar fashion.

The new base of this example, when crystallized 3 times from benzene resulted in a white powder having a melting point of 117.6–118.2° C.

*Analysis.*—Calculated for $C_{17}H_{15}N_2Cl$: N, 9.91%. Found: N, 10.10%.

Example 5

2-(2,4-dichlorobenzyl)-aminolepidine having the formula:

This new product was prepared by the same method as that used for the preparation and isolation of the analogous product of Example 4, except that 2,4-dichloro-benzyl chloride replaced the p.-chlorobenzyl chloride of Example 4.

The new product was obtained as a tan solid in a yield of 43.7 grams (69.0%), having a melting point of 144.5–146.5° C. On recrystallization from benzene to constant melting point, the compound melted at 146.5–147° C.

*Analysis.*—Calculated for $C_{17}H_{14}N_2Cl_2$: N, 8.83%. Found: N, 9.05%.

Example 6

2-(3,4-dichlorobenzyl)-aminolepidine having the formula:

This new compound was prepared by the same method as that used for the preparation and isolation of the isomeric product of Example 5, except that 3,4-dichloro-benzyl chloride was used as the reactant in place of the 2,4-dichlorobenzyl chloride employed as the reactant in Example 5.

The new compound was obtained in 69.0% yield (43.7 grams) having a melting point of 96–100° C. Two recrystallizations from methanol gave a white crystalline product having a melting point of 103–104° C.

*Analysis.*—Calculated for $C_{17}H_{14}N_2Cl_2$: N, 8.83%. Found: N, 8.76%.

Example 7

2-(2-thenyl)-aminolepidine having the formula:

This new compound was prepared in accordance with the procedure described in Example 2, using similar amounts of reactants, except that 2-thenyl chloride replaced the benzyl chloride of Example 2. The product of this example was obtained as a red, viscous liquid, distilling at 163–175° C. at 0.05 mm. in an amount of 31.2 grams (61.5%).

The hydrochloride was prepared by treating a hot aqueous suspension of the free base with concentrated hydrochloric acid. After chilling in an ice bath, the precipitate was separated by filtration and washed well with water followed by methanol and ether. The compound melted at 249.5–250° C. with decomposition. Recrystallization from ethanol lowered the melting point to 247.5° C., with darkening of the solid at about 244° C.

*Analysis.*—Calculated for $C_{15}H_{14}N_2S \cdot HCl$: Cl, 12.19%. Found: Cl, 11.98%.

Example 8

2-(5-chloro-2-thenyl)-aminolepidine having the formula:

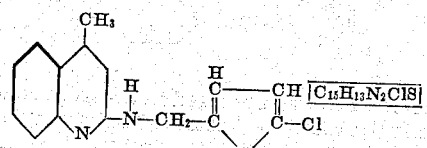

This new product was prepared in accordance with the procedure described in Example 2, except that the 5-chloro-2-thenyl chloride was used in place of the benzyl chloride of Example 2. This new base was obtained as a red, viscous liquid in 63.2% (36.6 grams) yield. It had a boiling point of 171–175° C. at 0.05 mm. The hydrochloride salt of this new base was prepared by the addition of concentrated hydrochloric acid to an acetone solution of the free base. There was obtained a light yellow precipitate which was recrystallized three times from 95% ethanol using decolorizing charcoal in the first recrystallization. The melting point of the salt was 224–226.5° C.

*Analysis.*—Calculated for $C_{15}H_{13}N_2S \cdot HCl$: Cl, 12.19%. Found: Cl, 11.98%.

Example 9

2-(4-methoxybenzyl)-aminolepidine

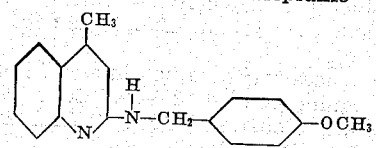

A solution of 31.6 grams (0.2 mol) of 2-aminolepidine and 27.2 grams (0.2 mol) of anisaldehyde in 50 ml. of formic acid (practical grade) was refluxed for 16 days. Water and ice were added to the cooled solution which was then made alkaline and extracted with chloroform. After drying over anhydrous potassium carbonate and removing the solvent, the residue was distilled under reduced pressure. The viscous oil thus obtained weighed 35.0 grams (62.7%) and distilled at 181–187° C. at 0.05 mm. The hydrochloride of this new base, prepared in anhydrous ether and recrystallized from ethanol-ether melted at 193–194° C.

*Analysis.*—Calculated for $C_{18}H_{18}N_2O \cdot HCl$: Cl, 11.26%. Found: Cl, 11.14%.

Example 10

2-(2,3-dimethoxybenzyl)-aminolepidine having the formula:

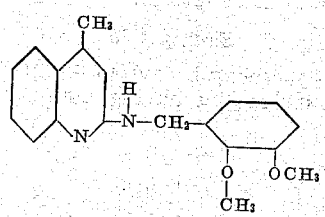

This new product was prepared in accordance with the procedure described in Example 9, except that 2,3-dimethoxybenzaldehyde was used in the place of the anisaldehyde of Example 9. The new compound was obtained as a red, viscous oil in a yield of 36.4% (22.5 grams). It had a boiling point of 198–203° C. at 0.09 mm.

*Analysis.*—Calculated for $C_{19}H_{20}N_2O_2$: N, 9.09%. Found: N, 8.93%.

The hydrochloride of this new base, prepared in anhydrous ether and recrystallized from ethanol-ether melted at 166–168° C.

Example 11

2-(3,4-dimethoxybenzyl)-aminolepidine having the formula:

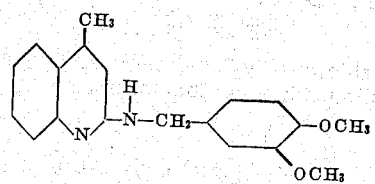

This new product was prepared in accordance with the procedure described in Example 9, except that 3,4-dimethoxybenzaldehyde replaced the anisaldehyde of Example 9. There was obtained a yellow, viscous oil having a boiling point of 203–207° C. at 0.07 mm. in a yield of 30.4 grams (42.9%). A considerable tarry residue remained in the still-pot. When rubbed with ether, the product solidified. This new compound, when recrystallized twice from methanol, was obtained as a white powder which melted at 146–147° C.

*Analysis.*—Calculated for $C_{19}H_{20}N_2O_2$: N, 9.09%. Found: N, 8.81%.

The hydrochloride of this new base, prepared in ether and recrystallized from ethanol-ether melted at 184.7–186° C.

Example 12

2-(3,4-methylenedioxybenzyl)-aminolepidine having the formula:

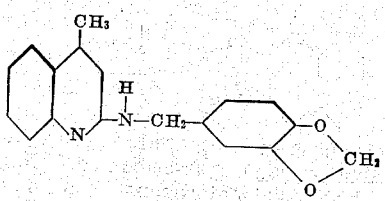

This new product was prepared in accordance with the procedure described in Example 9, except that 3,4-methylenedioxybenzaldehyde replaced the anisaldehyde of Example 9. The isolation and purification of the new product was complicated by some resinification that had occurred during the long period of reflux. The product, a red extremely viscous liquid, distilled at 190–192° C. at 0.06 mm., and weighed 30.2 grams (34.0%). The hydrochloride of this new base, prepared in ether and recrystallized twice from ethanol-ether, was a white powder melting at 220–221.5° C.

*Analysis.*—Calculated for $C_{18}H_{16}N_2O_2 \cdot HCl$: Cl, 10.78%. Found Cl, 10.61%.

Example 13

2-[(benzyl)(β-dimethylamino ethyl)]-aminolepidine having the formula:

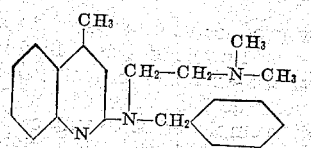

A mixture of 0.04 mol of 2-(benzyl)-aminolepidine, 2.5 grams of lithium amide and 100 ml. of dry toluene were refluxed for two hours. After cooling somewhat, 7.5 grams of β-dimethylaminoethylchloride hydrochloride followed by 50 ml. of toluene were added and the reaction mixture refluxed for an additional 19–20 hours. After removing the lithium chloride and solvent, as described in Example 3, the residue was distilled in vacuo. The new base was obtained in a yield of 72.6%. It had a boiling point of 158–165° C. at 0.06 mm.

*Analysis.*—Calculated for $C_{21}H_{25}N_3$: N, 13.16%. Found: N, 12.86%.

Example 14

2-[(2-chlorobenzyl)(β-dimethylamino ethyl)]-aminolepidine having the formula:

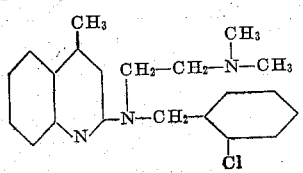

This new product was prepared in accordance with the general procedure described in Example 13, except that 2-(2-chlorobenzyl)-aminolepidine replaced the 2-(benzyl)-aminolepidine of Example 13.

This new base was obtained in a yield of 78.8%. It had a boiling point of 156° C. at 0.03 mm.

The dihydrochloride salt was prepared therefrom, melting point 214–215° C.

*Analysis.*—Calculated for $C_{21}H_{24}N_3Cl \cdot 2HCl$: Cl, 16.62%. Found: Cl, 16.18%.

Example 15

2-[(4-chlorobenzyl)(β-dimethylamino ethyl)]-aminolepdine having the formula:

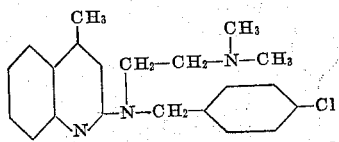

This new base was prepared in accordance with the general procedure described in Example 13, except that 2-(4-chlorobenzyl)-aminolepidine was used in the place of the 2-(benzyl)-aminolepidine of Example 13. This new base was obtained in a yield of 88%. It had a boiling point of 178° C. at 0.04 mm.

The dihydrochloride salt of the new base was also prepared.

*Analysis.*—Calculated for $C_{21}H_{24}N_3Cl \cdot 2HCl$: Cl, 16.2%. Found: Cl, 16.53%.

Example 16

2-[(2,4-dichlorobenzyl)(β-dimethylamino ethyl)]-aminolepidine having the formula:

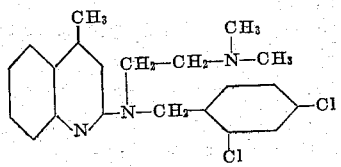

This new product was prepared in accordance with the general procedure described in Example 13, except that 2-(2,4-dichlorobenzyl)-aminolepidine was used in the place of the 2-(benzyl)-aminolepidine employed in Example 13.

The new base was obtained in a yield of 85.8%. It had a boiling point of 192° C.

*Analysis.*—Calculated for $C_{21}H_{23}N_3Cl_2$: N, 10.82%. Found: N, 11.16%.

Example 17

2-[(3,4-dichlorobenzyl)(β-dimethylamino ethyl)]-aminolepidine having the formula:

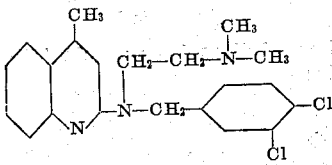

This new base was prepared in accordance with the general procedure described in Example 13, except that the 2-(3,4-dichlorobenzyl)-aminolepidine replaced the 2-(benzyl)-aminolepidine of Example 13.

The new product was obtained in a yield of 77.4%. It had a boiling point of 183–187° C. at 0.03 mm.

*Analysis.*—Calculated for $C_{21}H_{23}N_3Cl_2$: N, 10.82%. Found: N, 10.98%.

Example 18

2-[(2-thenyl)(β-dimethylamino ethyl)]-aminolepidine having the formula:

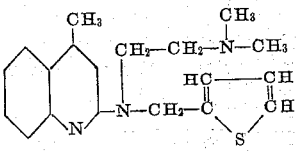

This new base was prepared in accordance with the general procedure described in Example 13, except that the 2-(thenyl)-aminolepidine replaced the 2-(benzyl)-aminolepidine of Example 13.

The new base was obtained in a yield of 74%. It had a boiling point of 159–172° C. at 0.05 mm.

*Analysis.*—Calculated for $C_{19}H_{23}N_3S$: N, 12.91%. Found: N, 13.09%.

Example 19

2-[(5-chloro-2-thenyl)(β-dimethylamino ethyl)]-aminolepidine having the formula:

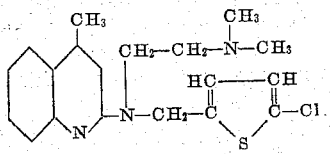

This new base was prepared in accordance with the general procedure described in Example 13, except that the 2-(5-chloro-2-thenyl)-aminolepidine was used in the place of the 2-(benzyl)-aminolepidine of Example 13.

This new base was obtained in a yield of 69.5%. It had a boiling point of 161–164° C. at 0.07 mm.

*Analysis.*—Calculated for $C_{19}H_{22}N_3ClS$: N, 11.68%. Found: N, 11.38%.

Example 20

2-[(4-methoxy benzyl)(β-dimethylamino ethyl)]-aminolepidine having the formula:

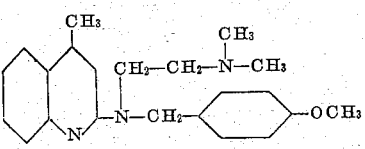

This new base was prepared in accordance with the general procedure described in Example 13, except that the 2-(4-methoxy benzyl)-aminolepidine was used in the place of the 2-(benzyl)-aminolepidine used in Example 13.

The base was obtained in a yield (on redistillation) of 55%. This product had a boiling point of 180° C. at 0.07 mm.

Analysis.—Calculated for $C_{22}H_{27}N_3O$: N, 12.03%. Found: N, 11.82%.

Example 21

2-[(2,3 - dimethoxy benzyl)(β - dimethylamino ethyl)]-aminolepidine having the formula:

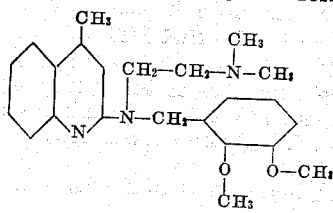

This product was prepared in accordance with the general procedure described in Example 13, except that 2-(2,3-dimethoxy benzyl)-aminolepidine replaced the 2-(benzyl)-aminolepidine of Example 13.

The new base was obtained in a yield (on redistillation) of 55.2%. It had a boiling point of 189–191° C. at 0.08 mm.

Analysis.—Calculated for $C_{23}H_{29}N_3O_2$: N, 11.0%. Found: N, 10.84%.

Example 22

2-[(3,4-dimethoxy benzyl)(β-dimethylamino ethyl)]-aminolepidine having the formula:

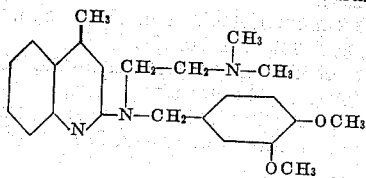

This new base was prepared in accordance with the general procedure described in Example 13, except that the 2-(3,4-dimethoxy benzyl)-aminolepidine replaced the 2-(benzyl)-aminolepidine of Example 13.

The new base was obtained (on redistillation) in a yield of 45%. It had a boiling point of 192–193° C. at 0.07 mm.

Analysis.—Calculated for $C_{23}H_{29}N_3O_2$: N, 11.07. Found: N, 11.81%.

Example 23

2-[(3,4 - methylene dioxy-benzyl)(β-dimethylamino ethyl)]-aminolepidine having the formula:

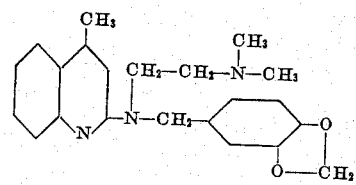

The product was prepared in accordance with the general procedure described in Example 13, except that the 2-(3,4-methylene dioxy-benzyl)-aminolepidine replaced the 2-(benzyl)-aminolepidine of Example 13.

The new base was obtained (on redistillation) in a yield of 46.9%. This product had a boiling point of 189–190° C. at 0.06 mm.

Analysis. — Calculated for $C_{22}H_{25}N_3O_2$: N, 11.56%. Found: N, 11.49%.

Example 24

2-[(benzyl)(β - morpholinoethyl)] - aminolepidine having the formula:

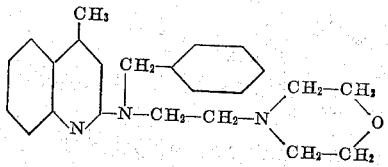

This product was prepared in accordance with the general procedure described in Example 13, except that the amounts of the reactants were varied. Thus, 0.5 mol of 2-(β-morpholinoethyl)-aminolepidine, 1.6 grams of lithium amide and 8.82 grams (0.065 mol) of benzyl chloride were reacted to produce the product of this example, which was obtained in a yield of 86.8%. This new base had a boiling point of 196° C. at 0.05 mm.

Analysis. — Calculated for $C_{23}H_{27}N_3O$: N, 11.63%. Found: N, 11.86%.

Example 25

2-[(benzyl)(γ-diethylaminopropyl)] - aminolepidine having the formula:

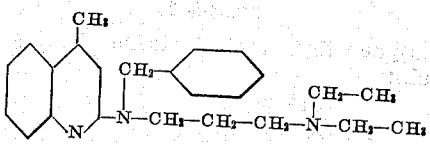

This product was prepared in accordance with the general procedure described in Example 24, except that the 2 - (γ - diethylaminopropyl) - aminolepidine, the product of Example 1, was used in the place of the analogous morpholino compound of Example 24.

This new product was obtained in a yield of 79.5%. It had a boiling point of 176–182° C. at 0.05 mm.

Analysis.—Calculated for $C_{24}H_{31}N_3$: N, 11.62%. Found: N, 11.72%.

Example 26

2 - (γ-di-n-butylaminopropyl) - aminolepidine having the formula:

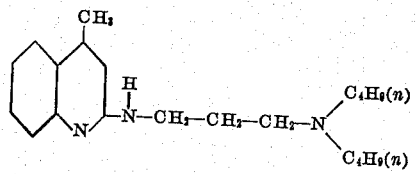

0.4 mole of 2-chlorolepidine and 0.8 mole of 3-di-n-butylaminopropylamine were heated at a bath temperature of 175° C. for 18.5 hours. The cooled reaction mixture was suspended in several hundred milliliters of ether. The precipitate was removed by filtration and washed well with ether. The filtrate, after removal of the ether, was distilled in vacuo. The product, a viscous orange oil, distilling at 130–138° C. at 0.05 mm., was obtained in 56% (73.6 grams) yield. On redistillation, the product, having a boiling point of 132–138° C., was obtained as a yellow oil.

Analysis.—Calculated for $C_{21}H_{33}N_3$: C, 76.84%; H, 10.16%. Found: C, 76.40%; H, 10.05%.

The picric acid salt, prepared in ether and recrystallized from acetone, melted at 187–188° C.

Example 27

2-(4 - diethylamino - 1 - methylbutyl) aminolepidene having the formula:

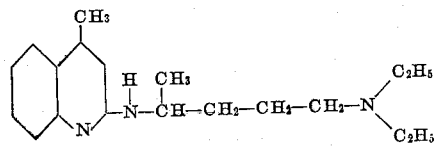

This compound was prepared in a manner similar to the procedure described in Example 26 using 0.5 mole of 2-chlorolepidine and one mole of 4-diethylamino-1-methylbutylamine and heating a mixture of the two for 17 hours at a bath temperature of 164° C. The product, 138.7 grams (92.7%), distilled at 134° C. at 0.04 mm. coming over as a very viscous orange oil. On redistillation there was obtained 130.2 grams of a viscous yellow oil, having a boiling point of 102–112° C.

The picrate, prepared in ether, was a light green powder, quite insoluble in all the common organic solvents. Recrystallized from chloroform, the product melted at 193.5–194.5° C.

*Analysis.*—Calculated for

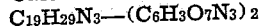

C, 49.14%; H, 4.66%. Found: C, 48.92%; H, 4.79%.

Example 28

2-(B-phenethyl)-aminolepidene having the formula:

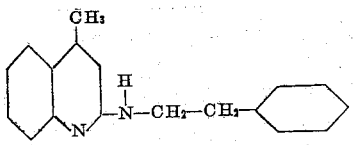

The preparation of this compound was effected by the method of Example 1, heating being maintained at 171–177° C. for 18 hours in this case. The product was obtained as a very viscous yellow oil, boiling at 132–142° C. The yield was 96.1% (126.1 g.—using 0.5 mole of 2-chlorolepidene).

The hydrochloric acid salt, prepare in ethanol and recrystallized from ethanol-ether, melted at 177–178° C.

The picric acid salt, prepared in ether and recrystallized from chloroform, melted at 183–4° C.

*Analysis.*—Calculated for $C_{18}H_{18}N_2C_6H_3O_7N_3$: C, 58.36%, H, 4.36%. Found: C, 58.65%, H, 4.31%.

I claim:

1. Compounds of the class consisting of the free bases and their acid addition salts wherein the free bases have the general formula:

$$Z—N(R')(R'')$$

wherein Z designates the 2-lepidyl radical; R' designates a member of the group consisting of hydrogen, lower alkyl, lower alkyl amino lower alkyl, and morpholino lower alkyl; R'' designates thenyl.

2. 2 - [(β - dimethylaminoethyl) (2 - thenyl)] aminolepidine.

IRVING ALLAN KAYE.

References Cited in the file of this patent

UNITED STATES PATENTS

| Number | Name | Date |
|---|---|---|
| 2,086,691 | Zerweck et al. | July 13, 1937 |

OTHER REFERENCES

Shreve et al.: Ind. and Eng. Chem., vol. 32. pp. 173–177 (1940).

Huttrer et al.: J. Am. Chem. Soc., vol. 68, pp. 1999–2002 (1946).

Kaye: J. Am. Chem. Soc., vol. 71, pp. 2322–2325 (July 1949).

Huttrer: Enzymologia, vol. 12, pp. 278, 282, 288, 290, 292, 293, 320, 321 (1947).

Shriner et al.: "Synthetic Antimalarials," page 25 (published in Bloomington, Ind., 1941).

Mosher: "Antimalarials: Natural and Synthetic," pp. 47 and 48 (Edwards Bros.; Ann Arbor, Mich., 1942).

Krahler et al.: J. Am. Chem. Soc., vol. 63, pp. 2367–2371 (1941).